United States Patent [19]

Kessler et al.

[11] Patent Number: 4,697,401
[45] Date of Patent: Oct. 6, 1987

[54] APPARATUS WITH INTEGRAL CUTTING MECHANISM FOR FORMING WRAPPED PACKAGES

[75] Inventors: Sheldon Kessler, Chicago; Vasilios Strubulis, Des Plaines, both of Ill.

[73] Assignee: Pack-All, Inc., Chicago, Ill.

[21] Appl. No.: 932,334

[22] Filed: Nov. 19, 1986

[51] Int. Cl.[4] .............................................. B65B 9/08
[52] U.S. Cl. ...................................... 53/459; 53/479; 53/568; 53/201; 53/372; 53/373
[58] Field of Search ................. 53/201, 459, 479, 567, 53/550, 568, 372, 373

[56] References Cited

U.S. PATENT DOCUMENTS

| | | |
|---|---|---|
| 2,852,898 | 3/1958 | Berg . |
| 3,053,723 | 9/1962 | Plach ............................... 53/567 X |
| 3,067,553 | 12/1962 | Rivman ............................. 53/568 X |
| 3,135,077 | 6/1964 | Siegal et al. . |
| 3,195,289 | 7/1965 | Cochrane . |
| 3,214,884 | 11/1965 | Langdon . |
| 3,239,993 | 3/1966 | Cherrin . |
| 3,262,833 | 7/1966 | Zelnick . |
| 3,323,282 | 6/1967 | Duns . |
| 3,496,700 | 2/1970 | McAbe ............................. 53/550 |
| 3,805,485 | 4/1974 | Swope . |

FOREIGN PATENT DOCUMENTS

| | | | |
|---|---|---|---|
| 2812326 | 9/1978 | Fed. Rep. of Germany ........ | 53/550 |
| 2397329 | 9/1979 | France ................................. | 53/550 |

Primary Examiner—John Sipos
Attorney, Agent, or Firm—Milton S. Gerstein; Marvin N. Benn

[57] ABSTRACT

An L-sealer apparatus in which the transverse arm portion of the pivotal pressure frame is provided with an adjustably-retractable cutting blade for alternatively forming bags having only three sealed sides thereof, with one side edge being left unsealed for subsequent closure by a twist-tie, and for alternatively forming conventional, completely sealed bags. A clamping element is provided for clamping the plastic film adjacent to the portion at which the cutting blade is to cut, in order to provide a clean cut. The plastic film is cut downstream or upstream of the portion being heat-sealed by the electrical heating wire provided with the transverse arm portion of the pressure frame. The cutting blade is adjustable such that its lower cutting edge may be alternately positioned below the lower edge surface of the clamping element to cut the plastic film, in order to form a bag sealed on three sides, or to raise the cutting edge of the blade above the lower edge surfaces of the clamping member, in order to provide a conventional bag completely sealed on all sides. The clamping member is mounted for relative movement with respect to the transverse arm portion of the pressure frame, with which it is floatingly mounted and urged toward the upper surface of the transverse arm portion by a plurality of spring members.

16 Claims, 10 Drawing Figures

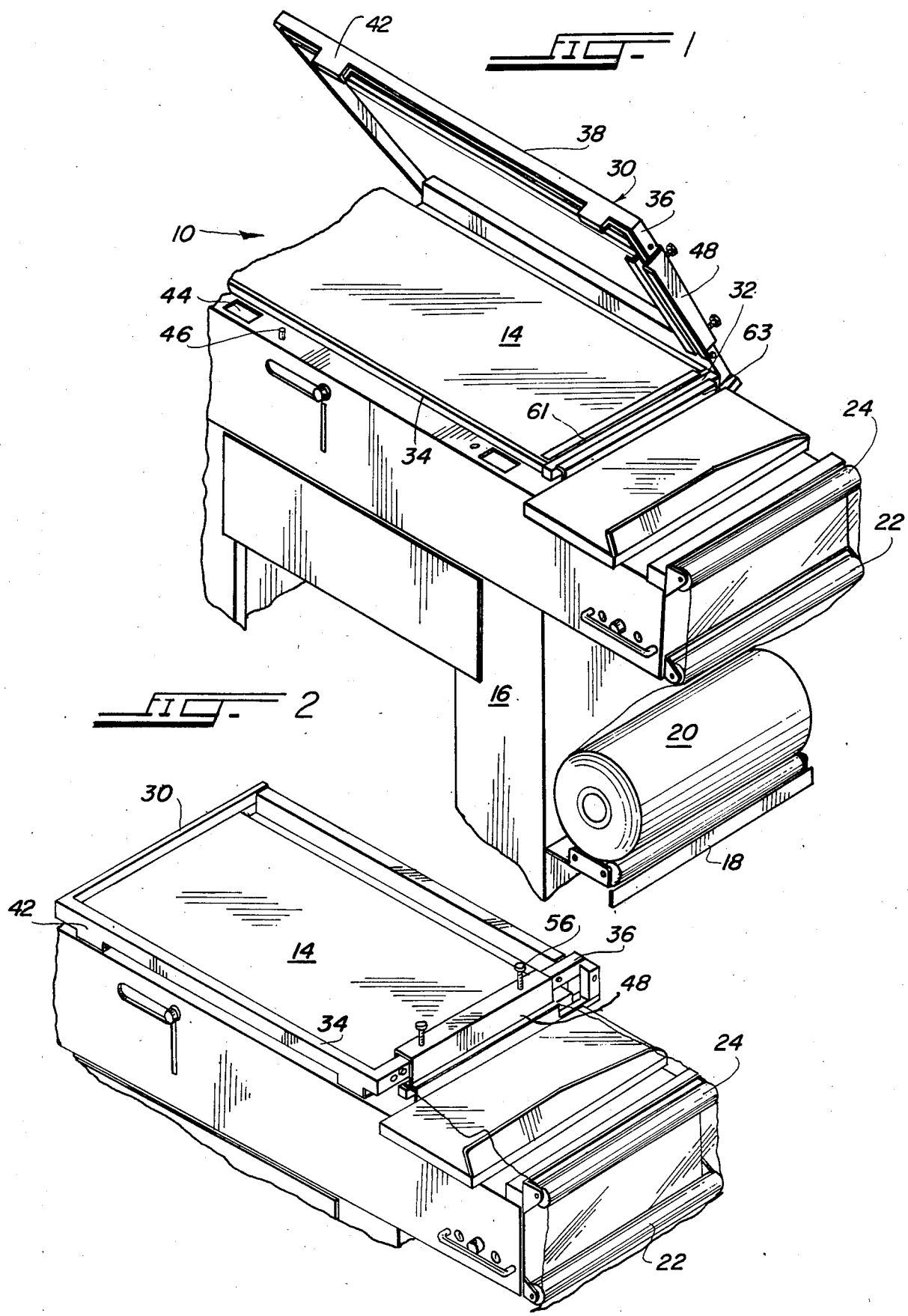

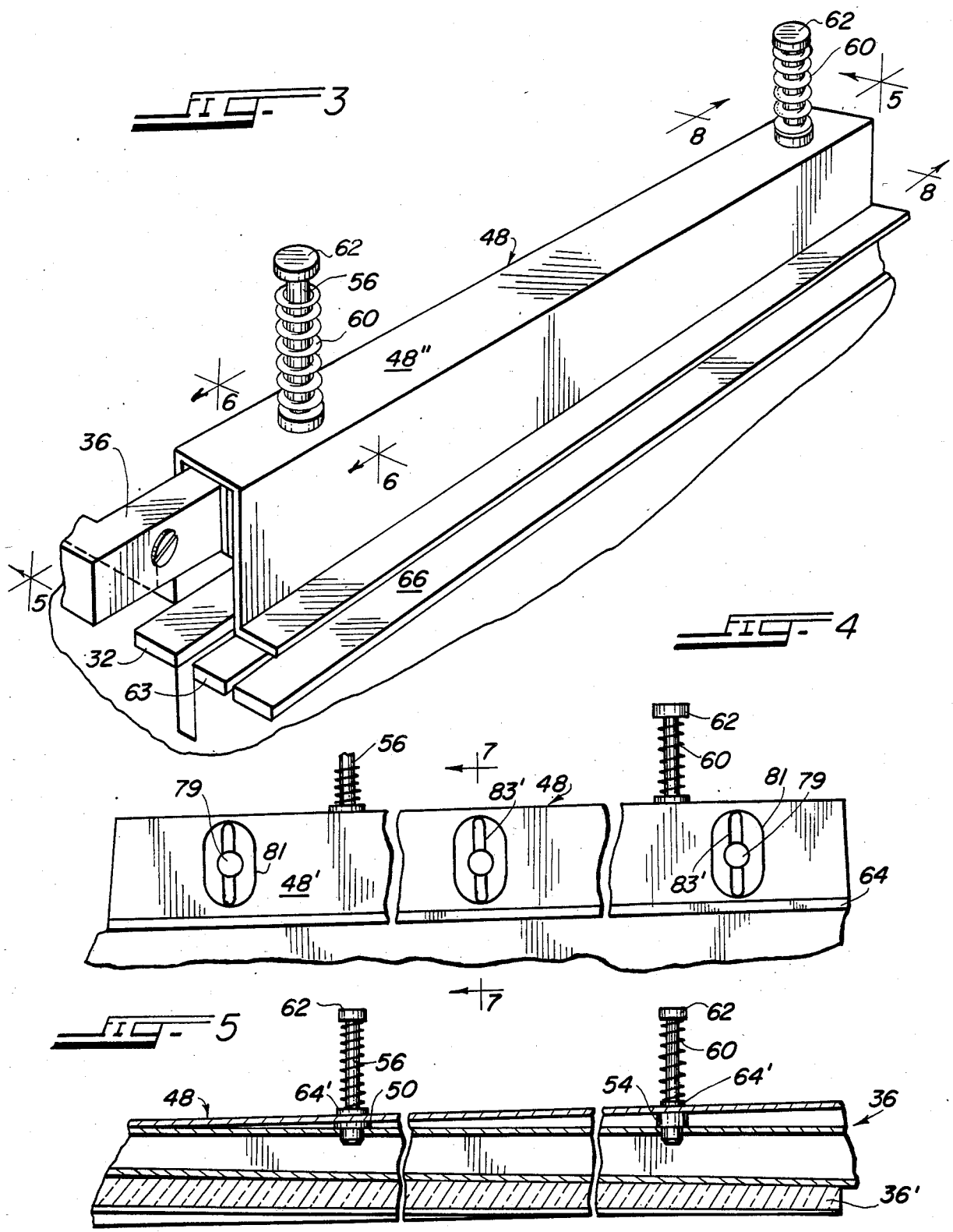

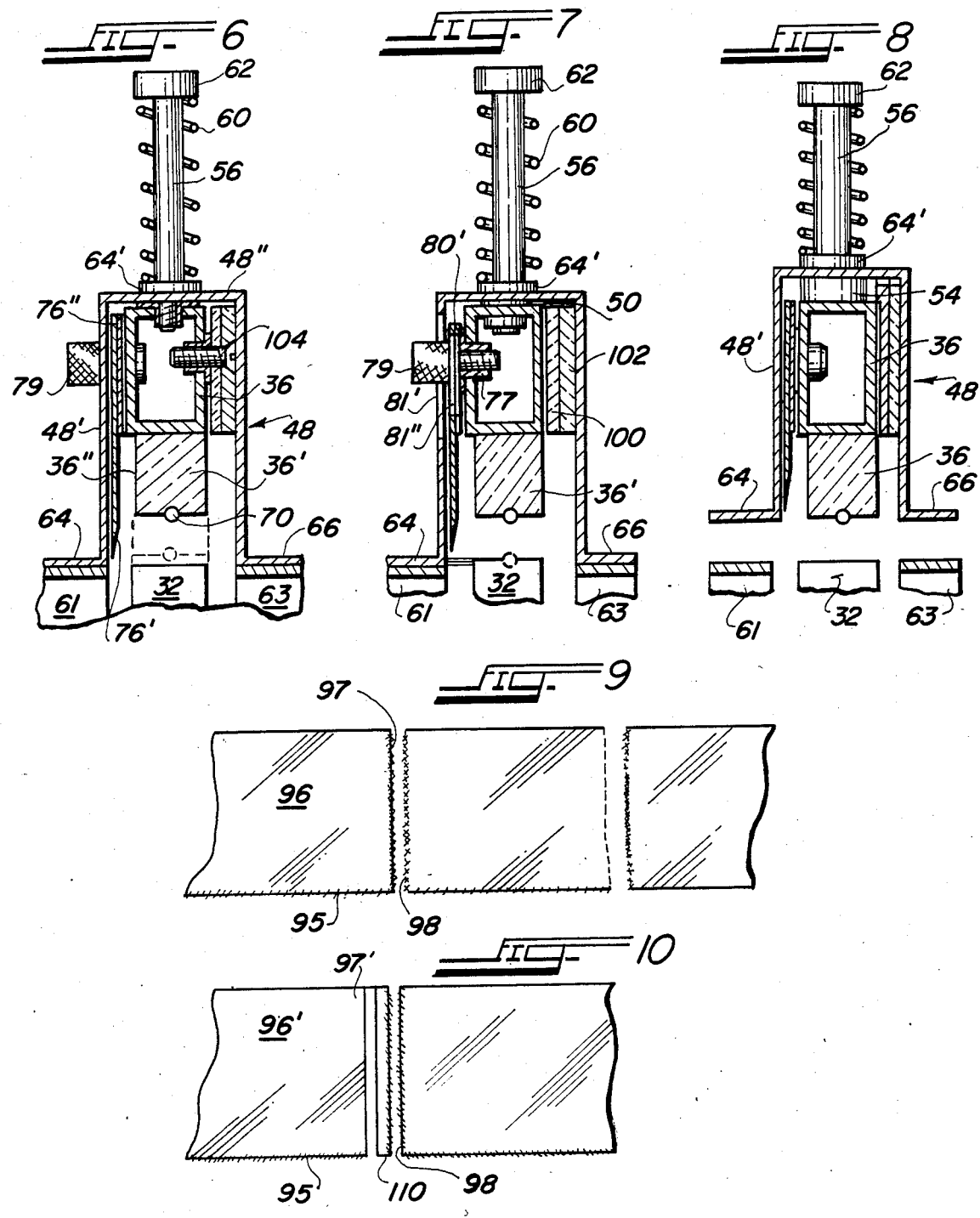

APPARATUS WITH INTEGRAL CUTTING MECHANISM FOR FORMING WRAPPED PACKAGES

BACKGROUND OF THE INVENTION

The present invention is directed to an apparatus for wrapping packages in heat-sealable wrapping materials, such as polypropylene film, and the like. The apparatus of the present invention has particular application to the wrapping of baked goods, such as bread, rolls, and the like. The present invention is an improvement on what is conventionally called a "L-sealer" machine currently in widespread use. The "L-sealer" machine comprises a pivotal, downwardly movable, heat-sealing and cutting pressure frame which includes a pair of electrically conductive wires arranged perpendicularly to each other to form an L-shape, which wires seal the plastic film thereunder upon pressure applied to the moveable frame, such that the transverse conductive wire cuts the plastic film into two distinct portions while, at the same time, forming a seal at each adjoining and severed portion of the plastic film. This provides a sealed edge for the plastic film in which is provided baked goods, and the like, while the upstream plastic film portion is sealed at that portion that will constitute the bottom or leading edge of the bag next-to-be-formed. Examples of the conventional L-sealer apparatus for forming a completely sealed plastic bag are disclosed in U.S. Pat. Nos. 3,135,077; 3,239,993; 3,323,282; and 3,214,884.

Conventional plastic film, bag-forming apparatuses of the L-sealer type feed plastic film over a roll with doubled-over plastic film. The doubled-over film is fed to a forming station and under the pivotal and downwardly movable pressure frame incorporating the L-seal arranged electrically-conductive wires. While at this location, the contents, such as baked goods, are placed in the plastic film between the doubled-over layers, and thereafter the pressure frame is pivoted downwardly and pressed to provide a seal for the two unsealed side edges via the pair of electrically-conductive wires. After the bag has been sealed, so that it is sealed around its entire circumference, it is removed and the previously sealed lead-end of the roll of plastic film is advanced to provide the next bag for wrapping the contents. During heat sealing by the two electrically conductive wires, both the trailing edge of the bag being formed and the leading edge of the next bag to be formed are sealed simultaneously via the transverse electrically-conductive wire generally extending perpendicularly to the path of travel of the plastic film. Conventional L-sealer packaging machines, as explained above, form a completely sealed bag with no open sides, which do not allow access to the interior of the bag without first destroying one of the closed sides thereof. Thus, when a consumer purchases the contents of the bag, he must tear open the bag in order to access the contents, thus destroying that bag for further use in storing the contents, since, upon opening the bag, at least one side has been destroyed and is not capable of being reclosed by the consumer in a manner assuring continued freshness to the contents.

It is the object of the present invention to provide an apparatus that forms a bag sealed and closed along only three of its sides, with the fourth side thereof constituting a top end that is left open and unsealed after the heat-sealing process. The open unsealed side may then be subsequently closed off via a twist-tie type of closure element, or the like, in order to allow the consumer to reuse the bag more than once, since the bag had not been destroyed upon being opened.

SUMMARY OF THE INVENTION

It is, therefore, the primary objective of the present invention to provide a plastic bag forming apparatus of the L-sealer type which, when forming the bag, provides one open end that is unsealed to allow the reclosing thereof a plurality of times.

It is another objective of the present invention to provide such a plastic bag forming apparatus that, while forming a bag sealed on three-sides, an open, unsealed top is formed simultaneously with the formation of the sealing of the leading edge of the bag next-to-be-formed and severed simultaneously therewith.

It is another objective of the present invention to provide a plastic bag forming apparatus in which a pivotally movable pressure frame is provided, which includes a U-shaped clamping member attached to the transverse arm of the pressure frame, which U-shaped clamping member is mounted for relative movement with respect to the transverse arm of the pressure frame, so that, upon movement of the pressure frame to its downward heat-sealing position, the transverse arm is moved downwardly relative to the U-shaped clamping to expose a cutting knife, to thereby sever the bag being formed and form an open top thereof.

It is yet another object of the present invention to provide a plastic bag forming apparatus incorporating therein a selectively exposable and vertically-adjustable cutting knife, which knife is mounted in the interior of the U-shaped clamping member on a side thereof remote from the portion of the pressure frame carrying one of the electrically-conductive, heat-sealing and cutting wires, so that the cutting knife will sever the bag being formed at the portion of the plastic film downstream of the portion of the film being severed and heat-sealed by the transverse, electrically-conductive wire.

It is also an objective of the present invention to provide for the mounting of the U-shaped clamping member at an inclined angle with respect to the transverse arm portion of the pressure frame, so as to allow for an even distribution of forces by the clamping member on a pair of foam pads therebelow, by taking into consideration the pivotal nature of the pressure frame, such that the U-shaped clamping member is sloped upwardly from front to rear along the transverse arm of the pressure frame, so that, when the pressure frame is pivoted downwardly for sealing and cutting, both the front clamping portions and the rear clamping portions of the U-shaped clamping member substantially contact the foam support pad surfaces and plastic film thereunder at the same time, thereby obviating undue stress on the rear portions of the foam pad support surfaces and damage to the folded-portions of the plastic film.

BRIEF DESCRIPTION OF THE DRAWINGS

The invention will be more readily understood with reference to the accompanying drawing, wherein:

FIG. 1 is a perspective view of the L-sealer, plastic bag forming apparatus according to the present invention;

FIG. 2 is a partial perspective view showing the pressure frame of the invention in its closed, cutting/sealing position for sealing a portion of the bag and for cutting the plastic film to divide the formed bag from the roll of plastic film;

FIG. 3 is a detailed perspective view of the transverse portion of the pressure frame incorporating therein the relatively movable U-shaped clamping element, in the interior of which is provided a cutting knife for severing the thus-formed plastic bag to provide an open top thereof;

FIG. 4 is a side elevational view of the transverse portion of the pressure frame of FIG. 3;

FIG. 5 is a cross-sectional view taken along line 5—5 of FIG. 3;

FIG. 6 is a cross-sectional view taken along line 6—6 of FIG. 3;

FIG. 7 is a cross-sectional view taken along line 7—7 of FIG. 4;

FIG. 8 is a cross-sectional view taken along line 8—8 of FIG. 3;

FIG. 9 is a plan showning a conventional plastic bag formed by a conventional L-sealer apparatus, in which all sides of the plastic bags thus-formed are closed; and FIG. 10 is a plan view showing a bag formed according to the present invention in which the edge thereof, adjacent the leading edge of the roll of film, is left open and unsealed to provide an opening to the thus-formed plastic bag.

DETAILED DESCRIPTION OF THE DRAWINGS

Referring now to the drawing in greater detail, the improved L-sealer package forming apparatus is indicated generally by reference numeral 10. The apparatus 10 includes, in conventional manner, package forming area 12 defined by a well 14, upon which rests the center-folded plastic film used in forming the plastic bag. The apparatus also includes main frame 16, a roll-supporting and unwinding portion 18 for rotatably supporting a supply of plastic film 20 for feeding the center-folded plastic film to the package forming area 14, guide rollers 22 and 24 for guiding the plastic film to the package forming area, and pivotal, pressure cutting and sealing head or frame 30, which cooperates with upwardly projecting, similarly-shaped stationary lower-supporting surfaces 32 and 34 which, in cooperation with the pivotal pressure frame 30, allow for the heat-sealing of the longitudinal, outward-edge surface of the plastic film parallel to the part of movement of the plastic film and the transverse portion of the film directly under the transverse arm portion 36 of the frame 30.

In the conventional use of an L-sealer package forming apparatus, electrically conducting wires are placed in both the transverse arm portion 36 of the pressure head 30, and in the longitudinal arm portion 38, which together form an L-shape. When the pressure head or frame 30 is pivoted downwardly, so that the arms 36 and 38 are in abutting relationship, respectively, against the upwardly projecting supporting surfaces 32 and 34, to sandwich therebetween portions of the plastic film, electric current is generated through the wires in the arms 36 and 38 to thereby seal, trim and cut the portions of the plastic film in contact with these wires. Thus, there is formed a circumferentially-closed bag, since the inward, longitudinal portion of the bag, indicated generally by reference number 40, is the center-folded portion of the plastic film from the roll 20, and since the forward leading edge of the plastic film in the plastic forming area 12 had already been sealed by the previous operation of plastic bag formation when the pressure head 30 had been pivoted downwardly to cause the arm 36 to abut against the support surface 32, with the wire thereof heat-sealing the plastic film in contact therewith, to thus form not only a sealed trailing end edge of the bag being formed at that time, but to also form the leading end edge of the bag to be formed next, all of which is conventional in the art. The frame 30 also includes downwardly projecting magnets 42 cooperating with electromagnets 44 provided in the frame 16, in order to hold the pressure frame or head 30 in its closed position upon closing and actuation of a switch 46, the electromagnets 44 being energized for a specific period of time by a timer, in the well-known manner, to keep the heat-sealed operation extant for a specified period of time. However, the present invention also has use in L-sealer apparatuses that do not use the electromagnets 44.

The conventional L-sealer forms a plastic bag that is completely closed around its entire circumference, i.e., on all four side edges thereof. Before forming the sealed bag, the contents to be included in the bag are placed between the doubled-over layers of the bag in the plastic forming area 12 of the apparatus, which is simply achieved by lifting the upper layer of the center-folded plastic material and inserting the contents between the two layers thereof. However, it is often desirable to provide a bag for baked goods, bread, and the like, that is not closed on all four side edges, but only on three side edges thereof, the fourth side edge being left open, for later closing by a twist-tie, or the like. This allows the contents of the bag to be removed without ripping open or damaging the bag, and allows the contents to be replaced or kept within the bag after re-closure by the twist-tie. In conventional completely closed-and-sealed plastic bags, the bag is usually destroyed or damaged to the point where it cannot be reused for subsequent storage. Toward this end, the present invention provides a cutting blade or knife for cutting the transverse, trailing end of the plastic material adjacent to the transverse bar 32. According to the invention, the pressure frame 30 is provided with a U-shaped, floating, clamping member 48. The U-shaped clamping member 48 is mounted about the transverse arm 36 of the pressure head 30, and is supported thereon in the manner disclosed in FIGS. 6 through 8. Wear plates 100 and 102 are secured to the upstream side surface of the transverse arm portion 36' to allow for the relative movement of the U-shaped clamping member 48 with respect to the transverse arm portion, which wear plates are secured in place by screws 104. Longitudinally spaced-apart bushings 50 and 54 are provided, which space the base 48" of the clamping member from the upper surface of the transverse arm 36. Movement of the clamping member 48 relative to the transverse arm 36 is provided via two guide pins 56 which extend through appropriately-sized openings in the bushings and in the base portion 48" of the clamping element 48. The lower end of each guide pin 56 is suitably affixed to the transverse arm 36 of the pressure head 30 for conjoint movement of the guide pin 56 with the pressure frame 30. Two compression springs 60 are provided for the two guide pins 56, which compression springs are mounted between a pair of limit stop members 62 and 64', the stop member 62 constituting an integral, enlarged, upper head-portion of the guide pin 56, while the stop member 64' constitutes a separable washer element, or the like, that is free for movement along the guide pin 56, so that the U- shaped clamping member 48 may be moved relative to the guide pins 56 against the force of the springs 60 and returned to its normal position, as shown in solid lines in FIGS. 6 through 8 when the pressure frame 30 is in its upward, non-sealing and non-cutting position. It is noted that the rear bushing 54, shown in FIG. 8, is thicker than bushing 50, so that the clamping member 48 is mounted on the transverse arm 36 of the pressure head 30 in an inclined manner. That is, the rear portion of the upper surface of the clamping member 48 is spaced a greater distance from the upper surface of the transverse arm 36 than the middle and forward portions of the clamping member, which middle and forward portions are those shown in FIGS. 6 and 7. Thus, in viewing FIG. 1, the U-shaped clamping member 48 is inclined in the direction from the longitudinal abutment surface 34 transversely toward the folded edge 40 of the plastic film 14. The U-shaped clamping member 48 is inclined so that the pair of stationary, upwardly projecting, transversely-extending lower abutment surfaces 61 and 63 wear evenly. The surfaces 61 and 63 project upwardly approximately equal to the projection of the surface 32. The U-shaped clamping member 48 is expressly provided in order to hold down the plastic film thereunder during the pivotally downward movement of the pressure head 30, which forces the electrical wires thereof into contact with the plastic film directly beneath, and to allow for a cut to be made as described hereinbelow.

The transverse electrical wire attached to the transverse arm portion 36 is indicated generally by reference numeral 70 in FIGS. 6 through 8. This wire 70 is attached by any conventional manner to the lower surface of the transverse arm portion 36, such as by an insulating, elongated bar 36'. The wire 70 is preferably mounted along the longitudinal center line of the transverse arm 36 and, therefore, is also centrally mounted along the interior of the U-shaped clamping element 48. Provided within the interior of the U-shaped clamping element 48, and directly attached to a side surface of the transverse arm portion 36, is a cutting blade or knife assembly 76 which is exposed upon the downward movement of the pressure frame 30 when end flanges 64 and 66 of clamping member 48 contact the abutment surfaces 61 and 63, respectively, to thereby cause relative movement between the U-shaped clamping member 48 and the downwardly moving transverse arm 36. Thus, as the pressure frame 30 is moved downwardly and the end flanges 64 and 66 contact the abutment surface 61 and 63, continued downward movement of the pressure frame 30 causes the knife assembly 76 to move downwardly therewith and cause movement of the transverse arm, wire, and knife assembly relative to the flanges 64 and 66, to thereby expose the cutting edge 76' of the knife assembly 76 below a plane containing therein the lowermost surfaces of the flanges 64 and 66, to thereby cut the plastic film material clamped between clamping flanges 64, 66.

In viewing FIGS. 6 through 8, there are transverse gaps provided between the upwardly-projecting abutment surfaces 61 and 63 and the centrally-located, electrical wire support surface 32. The gap between the abutment surface 61 and the central surface 32 provides the space through which the blade edge 76' enters and cuts the plastic film, on the side of the material downstream of the portion that is cut and sealed via the electrical wire 70. Thus, the plastic film material that is closer to the portion that is being formed into a bag is cut via the blade edge 76', so that the trailing edge of the bag is left open and unsealed, so that the bag may later be closed by conventional twist-ties, or the like, and thereby, made reclosable.

The knife assembly 76 is connected to the downstream side surface 36" of transverse arm 36 by three set screws 79, as shown in FIG. 4. Each set screw 79 has a main, threaded shaft portion receivable in a circular threaded bushing 77 provided in side surface 36". Each screw also passes through the supporting base portion of the blade assembly, which in the preferred embodiment includes a plurality of superimposed layers 80' for structural integrity. Provided in downstream-side leg portion 48' of the U-shaped clamping member 48 are three slots or grooves 81, through which the plurality of set screws pass. The slots 81 are wider than the bodies of the set screws to allow for the necessary play for relative rotation between the blade and clamping member. The slots 81 are generally vertically oriented when the pressure frame 30 is in its downward-most, heat-sealing and bag-forming position, as shown in FIG. 2.

The knife 76 is provided with three narrower, vertically-oriented slots 83' that are in alignment with the three slots 81 of the side surface 48'. The set screws 79 extend through these slots 81, with each slot actually being constituted by mutually-aligned slots formed in the plurality of layers 80 of the base portion of the knife assembly, as indicated by reference numerals 81' and 81" in FIG. 7. These slots 81 also allow for the relative repositioning of the clamping element and blade assembly. The slots 81 allow for the initial setting up of the knife 76 as to either make the knife active or inactive. When active, the knife is moved downwardly relative to the side surface 36" and locked in place via screws 79, with the blade edge 76' lying substantially below the wire 76, as shown in FIGS. 6 and 7. In the inactive state, the knife assembly is moved upwardly relative to the side surface 36" and locked in place by screws 79, so that the blade edge 76' is positioned substantially above the wire 70, as shown in FIG. 8. Thus, the apparatus 10 can be used for forming conventional, completely closed bags, or bags having one open side edge, as described above.

In the preferred embodiment, the blade edge 76' is substantially below the electrical wire 70 so that, when the electrical wire 70 seals and trims the plastic film thereunder during downward movement of the pressure head 30, the blade edge 76' has aleready cut the plastic film downstream of the sealed and trimmed portion, to form the open side edge of the bag being formed. The grooves or slots 81 also allow for the relative orientation of the U-shaped clamping member 48 with respect to the blade assembly 76 and transverse arm 36, so that the clamping member 48 may be mounted in the rearwardly inclined position, as described above. The rearwardly inclining angular mounting of the U-shaped clamping member 48 also means that, as the pressure frame 30 is pivoted downwardly, the blade edge 76' will cut along a transverse line with the assurance that the film is firmly clamped prior to cutting along the transverse line. FIG. 9 shows a conventional plastic bag being formed from plastic film, in which the perpendicular edges 95 and 97 of the bag formed are both sealed by the two electric wires, the sealed edge 97 being formed by the electrical wire 70. During the formation of the sealed edge 97, which forms the trailing end of the bag, the electrical wire simultaneously severs the plastic film to separate the bag thus-formed from the remainder of the film, while also forming a sealed leading edge 98, which forms one of the sealed edges of the bag to be formed next. In contrast, FIG. 10 shows a bag 96' formed according to the present invention, in which the leading edge 98 is severed from the trailing edge 97'. The trailing edge 97' is unsealed and is formed by the blade 76, while the edge 98 is sealed via the electrical wire 70. Surplus 110 remains after the cutting and sealing operation, which is discarded.

It is important that the sequence of steps performed in forming the bag according to the invention be clamping, cutting, and sealing. The step of clamping must be carried out first in order to hold the the plastic film firmly to allow for a proper cut. The step of cutting is performed before the step of sealing in order that the step of sealing does not interfere with the step of cutting.

While a specific embodiment of the invention has been shown and described, it is to be understood that numerous changes and modifications may be made therein without departing from the scope, intent, and spirit of the invention as set forth in the appended claims. For example, the cutting blade assembly may be mounted upstream of the electrical wire 70, so that the leading edge of the bag being formed is made the open, unsealed side edge. In this case, the gap between the supporting surface 32 and the abutment surface 63 will provide the space in which the the cutting blade will travel during cutting.

What is claimed is:

1. A method for forming a bag, in which there is utilized an L-sealing apparatus comprising a bag formation area including a pivotal pressure frame incorporating therein a pair of transversely-mounted, heat-sealing wires for sealing portions of the plastic film delivered to the bag formation area, said method comprising:
   (a) advancing doubled-over plastic film downstream to the bag formation area;
   (b) heat sealing cutting the upstream, transverse portion of the doubled-over film postioned during said step (a) to form two severed seals;
   (c) simultaneously with said step (b), heat sealing the doubled over, free, longitudinal edges of the plastic film at the bag formation area which are transverse to the transverse portion sealed during said step (b); and
   (d) cutting the film at a portion thereof spaced downstream from the cut made during said step (b) to form a bag with an open upstream end, said step (d) being performed before said steps (b) and (c).

2. The method according to claim 1, further comprising:
   (e) removing the thus-formed bag from the bag formation area formed by said steps (a) through (d), and advancing another doubled-over plastic film portion to the bag formation area;
   (f) adjusting a cutter on the pivotal pressure frame such that the lower edge of the cutting blade lies in a plane elevated above the plane containing therein the transverse heat sealing wire of the transverse arm portion of the pressure frame; and
   (g) thereafter heat sealing the transverse portion and the longitudinal portion of the doubled-over plastic film to form a completely sealed and enclosed bag.

3. The method according to claim 2, further comprising lowering the cutting blade in order to repeat said steps (a) through (d) a plurality of times.

4. The method according to claim 3, comprising repeating said steps (e) through (g) a plurality of times to, alternately, form bags being completely sealed and enclosed on all four sides thereof, and bags sealed only on three sides thereof with one side unsealed thereof.

5. The method according to claim 1, further comprising the step of clamping transverse portions of the doubled-over plastic film, prior to said steps (b) through (d), between which transverse portions the portion of the plastic film is to be cut during said step (d).

6. The method according to claim 1, wherein said step (b) comprises heat sealing a transverse portion of the doubled-over plastic film at a relatively upstream portion thereof; said step (d) comprising cutting a transverse portion of the doubled-over film at a portion thereof relatively downstream from the transverse portion of the plastic film to be heat-sealed during said step (b).

7. In an L-sealer apparatus for forming a bag of plastic film for wrapping contents therein, said apparatus comprising a main frame, means for rotatably supporting a roll of plastic film on said main frame, a bag formation area to which is delivered the plastic film for forming a bag, said bag formation area being located downstream along said main frame from said means for rotatably supporting said roll of plastic film, and comprising a lower plastic film supporting area, a pivotal pressure frame, said main frame having means for pivotally mounting said pressure frame for movement toward and away from said plastic film supporting area, said pressure frame comprising a first transverse arm portion extending generally perpendicularly to the path of travel of the plastic film, and a second longitudinal arm portion extending at right angles from an end of said first transverse arm portion, said second longitudinal arm portion extending generally parallel to the path of movement of the plastic film, each of said transverse arm portion and said longitudinal arm portion having an electrical heat-conducting wire for forming a seal at portions of the plastic film positioned thereunder for cutting the seal when said pressure frame is pivoted to its downward, sealing position, and means for mounting each respective said electrical heat-conducting wire to the respective said arm portion of said pressure frame, wherein the improvement comprises:
   cutting means mounted to said transverse arm portion and spaced downstream from said electrical heat-conducting wire of said transverse arm portion; whereby, when said pressure frame is pivoted downwardly into its heat sealing position, said cutting means cuts the plastic film directly therebelow to form a bag with an open upstream end;
   clamping means associated with said transverse arm portion for clamping portions of the plastic film when said pressure frame is pivoted into its downward, pressure-sealing position to thereby clamp portions of the plastic film on both the upstream and downstream side of said electrical wire of said first transverse arm portion; and
   means for mounting said clamping means for relative movement with respect to said transverse arm portion so that, when said pressure frame is pivoted into its downward sealing position, said clamping means has relative movement with respect to said transverse arm portion, to thereby expose the lower cutting edge of said cutting means below the lowermost plane of said clamping means to thereby cut the portion of the plastic film positioned therebelow.

8. The improvement according to claim 7, wherein said means for mounting said clamping means comprises spring-biasing means for urging said clamping means in a downward direction toward said bag formation area of said main frame, and pin means interconnecting said clamping means with said transverse arm portion to allow for the relative movement therebetween.

9. The improvement according to claim 7, wherein said clamping means comprises a substantially U-shaped element, and a pair of lower, oppositely-extending end flanges, said end flanges constituting the portion of said clamping means contacting the portions of the plastic film on either side of the portion of the plastic film to be cut by said cutting means when said pressure frame is pivoted into its downward, sealing position.

10. The improvement according to claim 9, wherein said main frame further comprises a pair of padded, upwardly-extending abutment surfaces for mutual engagement and cooperation with said pair of oppositely-extending end flanges of said clamping means, such that, when said pressure frame is pivoted to its downward, sealing position, said end flanges of said clamping means abut against said abutment surfaces to clamp therebetween a portion of the plastic film on either side of the portion thereof to be cut by said cutting means.

11. The improvement according to claim 7, wherein said cutting means comprises a cutting blade and means for mounting said cutting blade to one side surface of said transverse arm portion, such that said cutting blade is spaced in the longitudinal direction from said heat-conducting wire of said transverse arm portion.

12. The improvement according to claim 11, wherein said cutting blade further comprises a plurality of slots for receiving therethrough said means for mounting said cutting means to said one side surface of said transverse arm portion, such that the orientation of the cutting edge of said cutting blade relative to said electrical heat-conducting wire of said transverse arm portion may be adjusted so as to alternatively expose said cutting edge of said cutting blade below said clamping means when said pressure frame is pivoted to its downward, sealing position, and, alternatively, to withdraw said cutting blade so as not to cut the plastic film thereunder when said pressure frame is pivoted to its downward, sealing position, to thereby allow for alternatively both a completely sealed bag and a bag having only three of its side edges thereof sealed with one side edge thereof being left open to be closed off by a twist-tie.

13. The improvement according to claim 12, wherein said means for mounting said clamping means relative to said transverse arm portion comprises at least one upstanding pin means having an upper end thereof with an enlarged head, and a lower end thereof fixedly connected to a portion of said transverse arm portion, and at least one spring means mounted between said enlarged head portion of said pin means and the upper surface of said clamping means to thereby urge said clamping means in a direction toward said transverse arm portion and to allow for relative movement therebetween.

14. The improvement according to claim 13, wherein said clamping means comprises a plurality of slots for alignment and cooperation with said plurality of slots of said cutting blade, whereby said means for mounting said cutting means to said transverse arm portion may be accessed by said slots of said clamping means and for allowing relative movement therebetween.

15. The improvement according to claim 14, wherein said means for mounting said cutting means to said transverse arm portion comprises a plurality of set screws, each said set screw having an enlarged head and an elongated shank portion, said screws extending through said plurality of slots of said cutting blade, each said elongated shank of said screws having a diametric extension less than the width of a respective said slot of each of said slots of said clamping means and said cutting blade, whereby said cutting blade is allowed movement relative to said transverse arm portion in order to make the cutting blade either active or inactive.

16. The improvement according to claim 7, wherein said clamping means comprises an upper surface and a pair of downwardly-extending side surfaces sandwiching therebetween said transverse arm portion, said clamping means being mounted at an angle with respect to said transverse arm portion such that said upper surface of said clamping means is inclined rearwardly relative to the upper surface of said transverse arm portion, and means for positioning said clamping means in said rearward incline relative to said upper surface of said transverse arm portion whereby, when said pressure frame is pivoted to its downward, sealing position, said clamping means substantially contacts the plastic film thereunder at approximately the same time along the length thereof.

* * * * *